United States Patent
Liu et al.

(10) Patent No.: US 8,918,057 B2
(45) Date of Patent: Dec. 23, 2014

(54) INTELLIGENT TRANSMISSION ANTENNA SELECTION METHOD AND COMMUNICATIONS APPARATUS UTILIZING THE SAME

(75) Inventors: Yi-Chang Liu, Dayuan Township, Taoyuan County (TW); Shun-An Yang, Baoshan Township, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 575 days.

(21) Appl. No.: 13/188,086

(22) Filed: Jul. 21, 2011

(65) Prior Publication Data

US 2012/0021702 A1 Jan. 26, 2012

Related U.S. Application Data

(60) Provisional application No. 61/367,732, filed on Jul. 26, 2010.

(51) Int. Cl.
*H04B 1/38* (2006.01)
*H04W 52/02* (2009.01)

(52) U.S. Cl.
CPC .................... *H04W 52/0251* (2013.01)
USPC .... 455/67.11; 455/90.2; 455/101; 455/277.2; 455/452.1; 455/562.1; 370/329; 370/334; 370/345

(58) Field of Classification Search
CPC .......... H04W 52/0251; H04W 72/082; H04W 72/0453; H04W 24/10; H04W 72/04; H04W 72/0413; H04B 17/00; H04B 1/38; H04B 13/005
USPC ................ 455/67.11, 63.4, 69, 73, 90.2, 101, 455/277.2, 452.1, 452.2, 561, 562.1; 370/280, 329, 334, 345; 375/148, 224, 375/260
See application file for complete search history.

(56) References Cited

U.S. PATENT DOCUMENTS

2009/0274110 A1* 11/2009 Teo et al. ............... 370/329
2010/0322328 A1* 12/2010 Schirmacher et al. ........ 375/260

* cited by examiner

*Primary Examiner* — Shaima Q Aminzay
(74) *Attorney, Agent, or Firm* — McClure, Qualey & Rodack, LLP

(57) ABSTRACT

A communications apparatus. Multiple antennas are arranged to receive downlink signals and transmit uplink signals. A transceiver module is arranged to receive the downlink signals from the antennas and pass the uplink signals to an antenna selection device. The antenna selection device is coupled between the antennas and the transceiver module and arranged to receive the uplink signals to be transmitted from the transceiver module and dynamically pass the uplink signals to one of the antennas according to an antenna selection signal. A processor is arranged to receive the downlink signals from the transceiver module, calculate short-term signal qualities of the downlink signals and generate the antenna selection signal according to the short-term signal qualities.

16 Claims, 10 Drawing Sheets

US 8,918,057 B2

INTELLIGENT TRANSMISSION ANTENNA SELECTION METHOD AND COMMUNICATIONS APPARATUS UTILIZING THE SAME

CROSS REFERENCE TO RELATED APPLICATIONS

This application claims the benefit of U.S. Provisional Application No. 61/367,732 filed Jul. 26, 2010 and entitled "Transmit Antenna Diversity for MIMO System". The entire contents of which are hereby incorporated by reference.

BACKGROUND OF THE INVENTION

1. Field of the Invention

The invention relates to an intelligent transmission antenna selection method and more particularly to an intelligent transmission antenna selection method for selecting a transmission antenna based on downlink signal qualities.

2. Description of the Related Art

Portable battery powered wireless communications devices, such as mobile terminals, cell phones, personal digital assistants, tablet computers, and the like, often have requirements to efficiently transmit information at different output power levels. As a result, RF transmitter power amplifiers need to transmit over a wide range of output power levels, while maintaining efficiency throughout operating ranges. Conventionally, in a Multiple-Input-Multiple-Output (MIMO) system, the signal power may be increased (for example, doubled) when using antenna diversity. However, when the signal loss in one signal path is serious, the benefit of using multiple power amplifiers cannot be gained, and the output power is wasted.

Therefore, an intelligent transmission antenna selection method for dynamically selecting the optimal transmission antenna based on characteristics of channels is highly required.

BRIEF SUMMARY OF THE INVENTION

A communications apparatus and an intelligent transmission antenna selection method are provided. An embodiment of a communications apparatus comprises a plurality of antennas, a transceiver module, a antenna selection device and a processor. The antennas are arranged to receive downlink signals and transmit uplink signals. The transceiver module is arranged to receive the downlink signals from the antennas and pass the uplink signals to an antenna selection device. The antenna selection device is coupled between the antennas and the transceiver module and arranged to receive the uplink signals to be transmitted from the transceiver module and dynamically pass the uplink signals to one of the antennas according to an antenna selection signal. The processor is arranged to receive the downlink signals from the transceiver module, calculate short-term signal qualities of the downlink signals and generate the antenna selection signal according to the short-term signal qualities.

An embodiment of an intelligent transmission antenna selection method comprises: receiving downlink signals from a plurality of antennas; estimating characteristics of channels that the downlink signals have passed through; determining an antenna switching period and an average scheme according to the estimated characteristics of the channels; calculating short-term signal qualities of the downlink signals received in the antenna switching period according to the average scheme; and selecting one of the antennas to transmit uplink signals according to the calculated short-term signal qualities.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
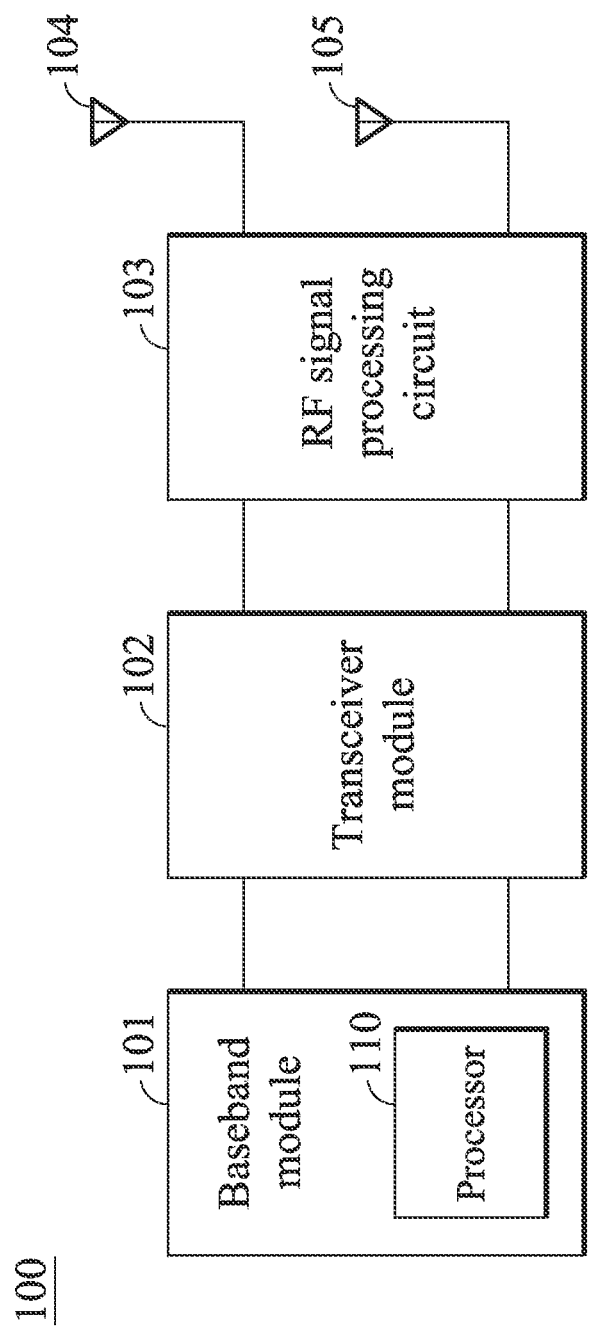
FIG. 1 shows a simplified block diagram of a communications apparatus according to an embodiment of the invention.

FIG. 1 shows a simplified block diagram of a communications apparatus according to an embodiment of the invention. The communications apparatus 100 may comprise a baseband module 101, a transceiver module 102, a radio frequency (RF) signal processing circuit 103 and multiple antennas 104 and 105. The antennas 104 and 105 are arranged to receive downlink signals from an air interface and transmit uplink signals to the air interface. The RF signal processing circuit 103 may comprise one or more TR (transmit and receive) switches for switching the downlink and uplink paths between the transceiver module 102 and the antennas 104 and 105, and one or more power amplifiers for amplifying the uplink signals to be later transmitted to the air interface and amplifying the downlink signals that have been received from the antennas.

The transceiver module 102 may receive the downlink signals, down convert the frequencies of the downlink signals to be passed to the baseband module 101, or receive uplink signals from the baseband module 101 and up convert the frequencies of the uplink signals to be later transmitted. The transceiver module 102 may comprise multiple hardware devices to perform radio frequency conversion. For example, the transceiver module 102 may comprise a mixer to multiply the signals with a carrier oscillated in the radio frequency of the wireless communications system. The baseband module 101 may comprise at least a processor 110 and multiple hardware devices to perform signal processing, including Analog to Digital Conversion (ADC)/Digital to Analog Conversion (DAC), gain adjusting, modulation/demodulation, encoding/decoding, and so on.

Figure 2:
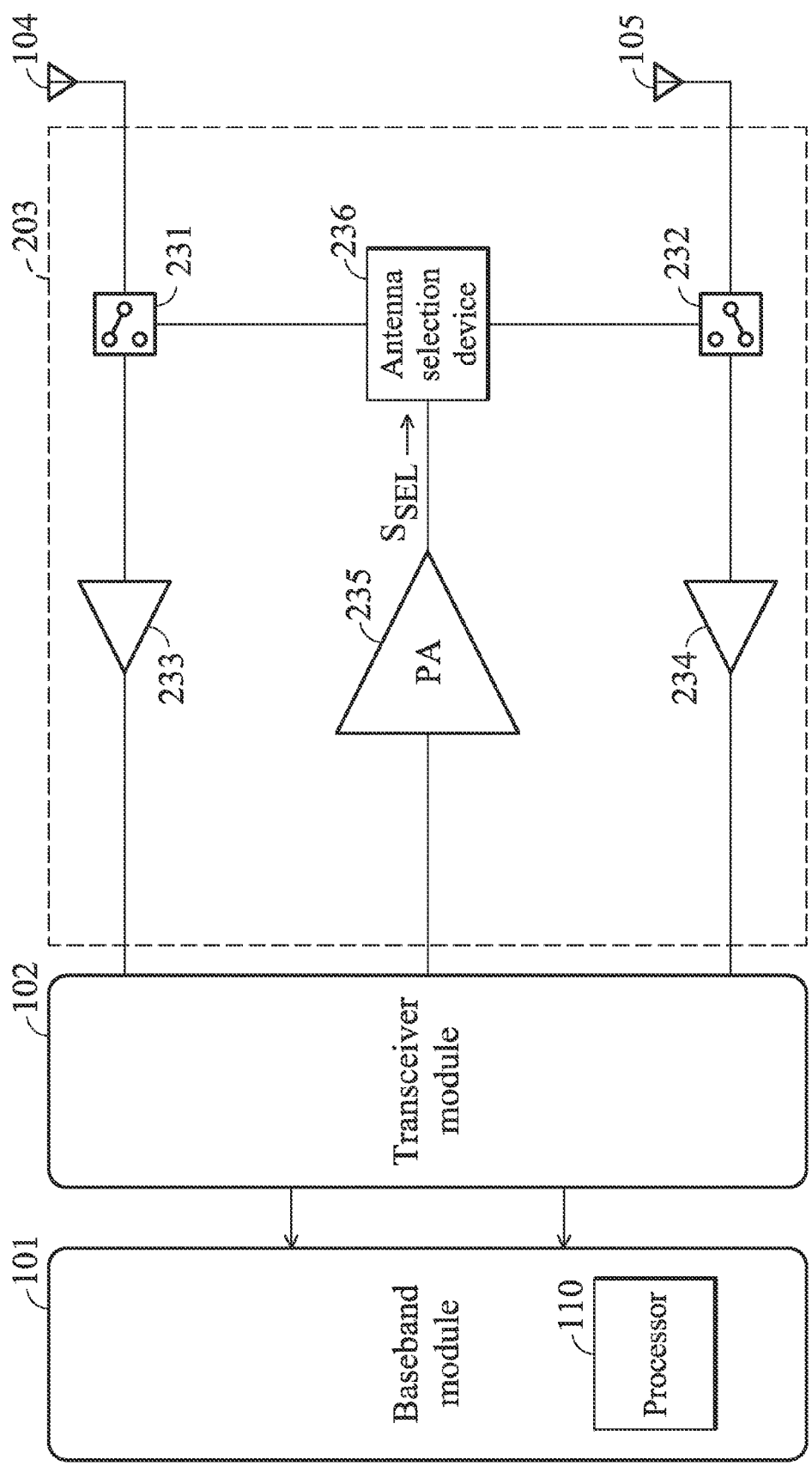
FIG. 2 shows a simplified block diagram of a communications apparatus with an antenna selection device coupled therein according to an embodiment of the invention.

FIG. 2 shows a simplified block diagram of a communications apparatus with an antenna selection device coupled therein according to an embodiment of the invention. As shown in FIG. 2, the RF signal processing circuit 203 may comprise TR switches 231 and 232, power amplifiers 233 and 234 in downlink paths, a power amplifier 235 in the uplink paths and an antenna selection device 236 coupled between the transceiver module 102 and the antennas 104 and 105. The TR switches 231 and 232 are arranged to selectively connect the antennas 104 and 105 to the downlink paths or the uplink paths. The power amplifiers 233 and 234 in the downlink paths are arranged to amplify the downlink signals that have been received from the antennas 104 and 105, and the power amplifier 235 is arranged to amplify the uplink signals to be later transmitted. In the embodiment, the antenna selection device 236 is arranged to receive the amplified uplink signals to be transmitted from and power amplifier 235 and dynamically pass the uplink signals to one of the antennas 104 and 105 according to an antenna selection signal $S_{SEL}$.

Figure 3:
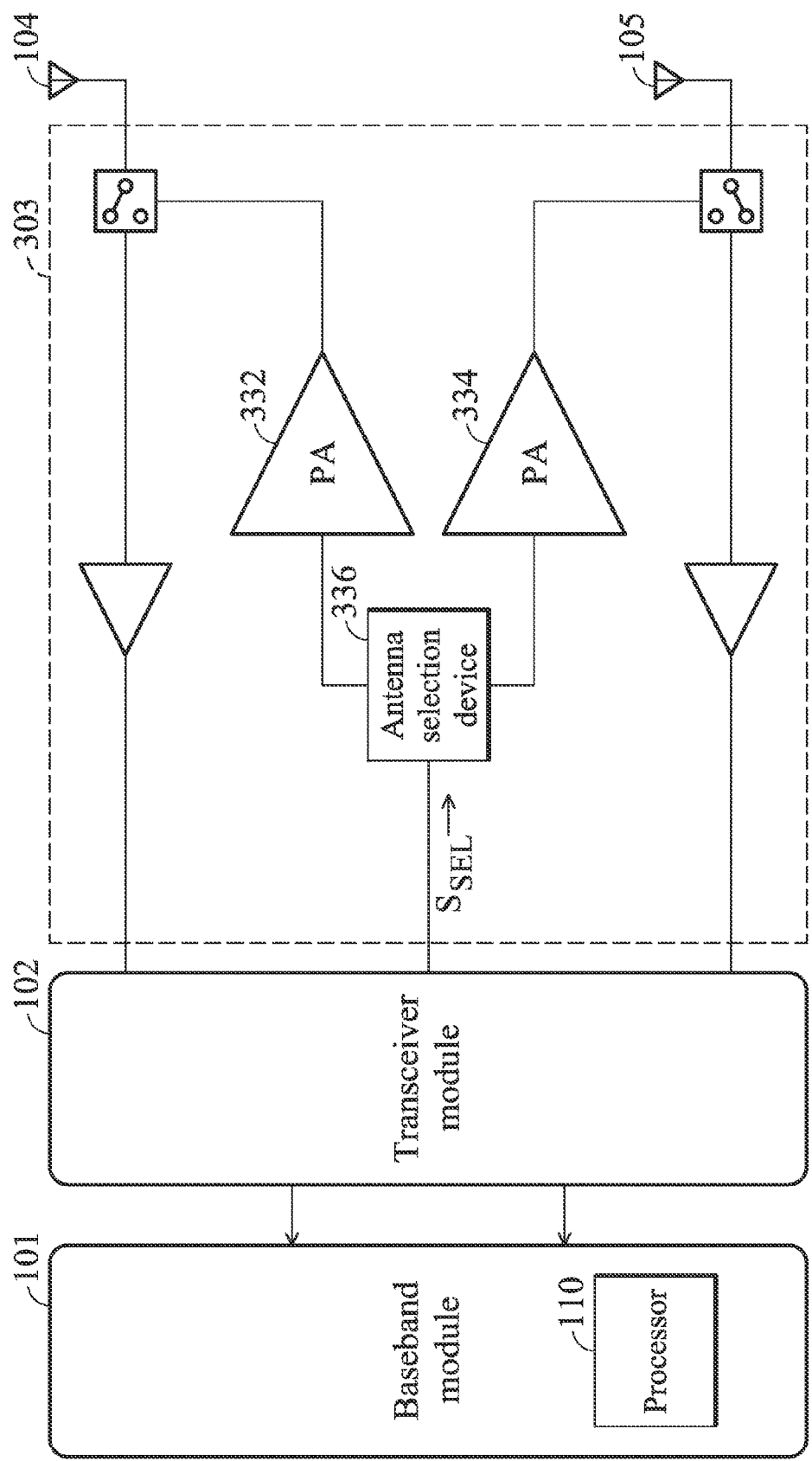
FIG. 3 shows a simplified block diagram of a communications apparatus with an antenna selection device coupled therein according to another embodiment of the invention.

FIG. 3 shows a simplified block diagram of a communications apparatus with an antenna selection device coupled therein according to another embodiment of the invention. As shown in FIG. 3, in the uplink path, the RF signal processing circuit 303 comprises an antenna selection device 336 coupled between the transceiver module 102 and the power amplifiers 332 and 334. Similarly, the antenna selection device 336 is arranged to receive the uplink signals to be transmitted from the transceiver module 102 and dynamically pass the uplink signals to one of the power amplifiers 332 and 334 and one of the antennas 104 and 105 according to an antenna selection signal $S_{SEL}$.

Figure 4:
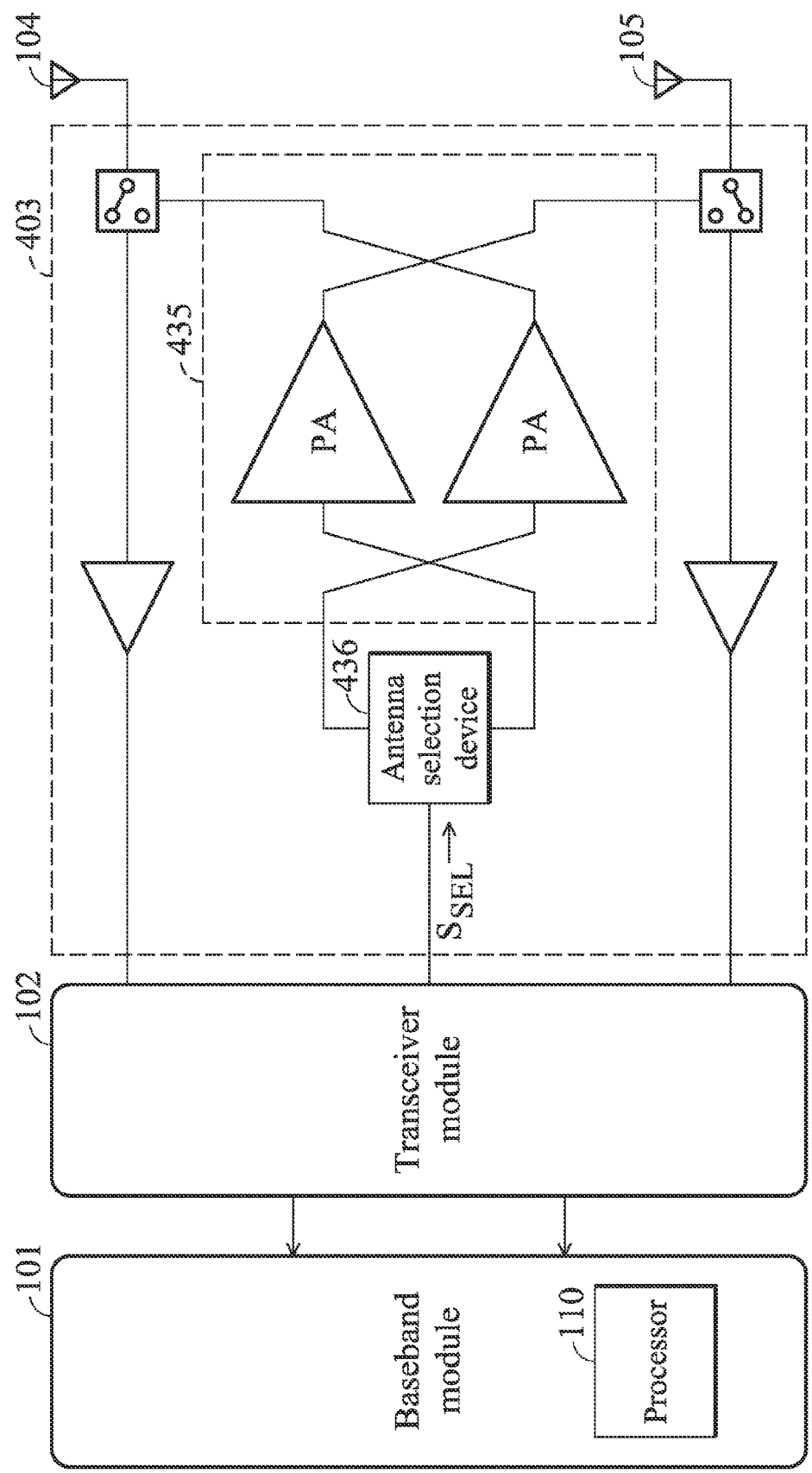
FIG. 4 shows a simplified block diagram of a communications apparatus with an antenna selection device coupled therein according to yet another embodiment of the invention.

FIG. 4 shows a simplified block diagram of a communications apparatus with an antenna selection device coupled therein according to yet another embodiment of the invention. As shown in FIG. 4, in the uplink path, the RF signal processing circuit 403 comprises an antenna selection device 436 coupled between the transceiver module 102 and a quadrature power amplifier 435. Similarly, the antenna selection device 436 is arranged to receive the uplink signals to be transmitted from the transceiver module 102 and dynamically pass the uplink signals to one of the input terminals and one of the antennas 104 and 105 according to an antenna selection signal $S_{SEL}$. In some embodiments of the invention, the antenna selection devices 236, 336 and 436 may be simply implemented by switch devices. However, in other embodiments, the antenna selection devices 236, 336 and 436 may also be implemented by any devices performing substantially the same function or achieving substantially the same result, and the invention should not be limited thereto.

According to an embodiment of the invention, the processor 110 may first calculate long-term downlink signal quality differences and/or characteristics of the channels to determine an antenna switching period and an average scheme. After the antenna switching period and the average scheme have been determined, the processor 110 may further calculate short-term downlink signal qualities according to the average scheme in the antenna switching period. Based on the calculated short-term downlink signal qualities, the processor 110 may select an optimal uplink path for transmitting the uplink signals, and generate the antenna selection signal $S_{SEL}$ according to the selection result to control the operation of the antenna selection device (e.g. the antenna selection devices 236, 336 and 436 as shown). Note that in some embodiments of the invention, the long-term downlink signal quality differences and characteristics of the channels may be continuously calculated and estimated by the processor 110 regardless of the antenna switching period. However, the antenna switching period and the average scheme determined according to the long-term downlink signal quality difference and/or characteristics of the channels may be updated at every antenna switching period.

According to an embodiment of the invention, the processor 110 may calculate the differences in the received signal strength indicator (RSSI), the signal to noise ratio (SNR), or the carrier to interference and noise ratio (CINR), or combinations thereof (for example, when the RSSI is larger than a predetermined threshold, the processor 110 may calculate the RSSI; otherwise, the processor 110 may calculate the SNR), between different antennas according to the downlink signals received from the different antennas, so as to obtain the long-term downlink signal quality difference. In addition, the processor 110 may further estimate characteristics of the channels. In one embodiment, the processor 110 may estimate the characteristics of the channels by estimating a moving speed of the communications apparatus. In another embodiment, the processor 110 may estimate channel impulse responses of the channels based on the received pilot signals, and estimate the characteristics of the channels by calculating correlations of the channel impulse responses. In yet another embodiment, the processor 110 may estimate the characteristics of the channels by calculating variations of a received signal strength indicator (RSSI) of the downlink signals. The variations of the RSSI may be obtained by, for example, calculating the standard deviation, the correlation and/or the variance of the RSSI.

Figure 5:
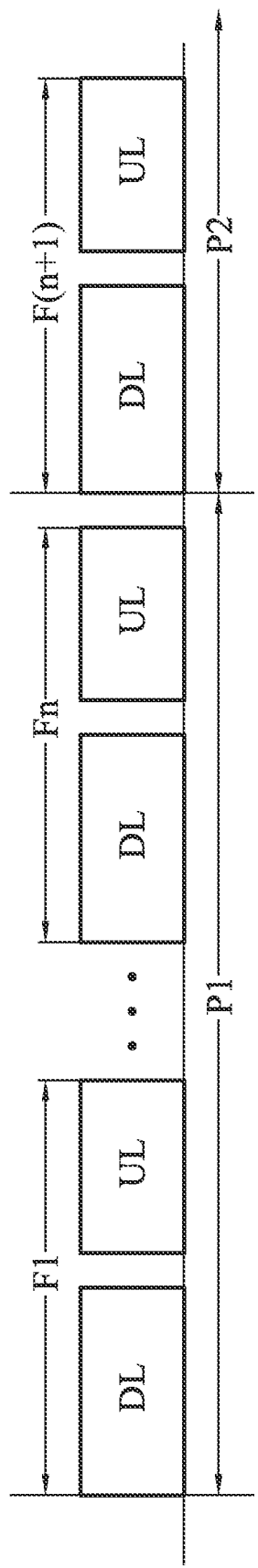
FIG. 5 shows a downlink and uplink schedule in a Time-Division Duplex (TDD) system according to an embodiment of the invention.

FIG. 5 shows a downlink and uplink schedule in a Time-Division Duplex (TDD) system according to an embodiment of the invention. In FIG. 5, there are (n+1) frames F1~F(n+1) shown in the schedule. In each frame period, the antennas are first switched (e.g. by the TR switches as shown in FIG. 2~FIG. 4) to the downlink path to receive the downlink signals during the downlink interval DL as shown. Then, the antennas are switched to the uplink path to transmit the uplink signals during the uplink interval UL as shown. Therefore, according to the embodiment of the invention, after receiving the downlink signals from the transceiver module 102, the processor 110 may begin to calculate the long-term downlink signal quality differences and estimate the characteristics of the channels to determine an antenna switching period and an average scheme, and then begin to calculate the short-term downlink signal qualities based on the determined antenna switching period and the average scheme to obtain the antenna selection result. Note that, as previously described, the long-term downlink signal quality differences and characteristics of the channels may be continuously calculated and estimated by the processor 110 regardless of the antenna switching period, but the antenna switching period and the average scheme determined according to the long-term downlink signal quality differences and characteristics of the channel is preferably updated at every antenna switching period.

According to an embodiment of the invention, the short-term downlink signal qualities may be continuously calculated based on the determined average scheme during the antenna switching period, and an antenna selection result may be obtained according to the calculated short-term downlink signal qualities. The antenna selection result may be applied from the beginning of, the end of or from any frame within the antenna switching period. For example, as shown in FIG. 5, after averaging the short-term downlink signal qualities within the antenna switching period P1, an antenna selection result may be obtained according to the averaged short-term downlink signals qualities. The processor 110 may generate the antenna selection signal $S_{SEL}$ according to the antenna selection result in frame F(n+1). Therefore, the antenna selection devices 236, 336 and 436 may select one uplink path and one antenna to transmit uplink signals in response to the antenna selection signal $S_{SEL}$.

For another example, in frame F1, the processor 110 may generate the antenna selection signal $S_{SEL}$ according to a previously obtained antenna selection result, and the antenna selection devices 236, 336 and 436 may select one uplink path and one antenna to transmit uplink signals in response to the antenna selection signal $S_{SEL}$. The processor 110 may further calculate the short-term downlink signal qualities during the antenna switching period P1 to obtain a next antenna selection result. A next obtained antenna selection result may be applied in the next antenna switching period. For yet another example, the processor 110 may also start to apply the antenna selection result from any frame within the antenna switching period, and may keep using the selected antenna during the antenna switching period.

Figure 6A:
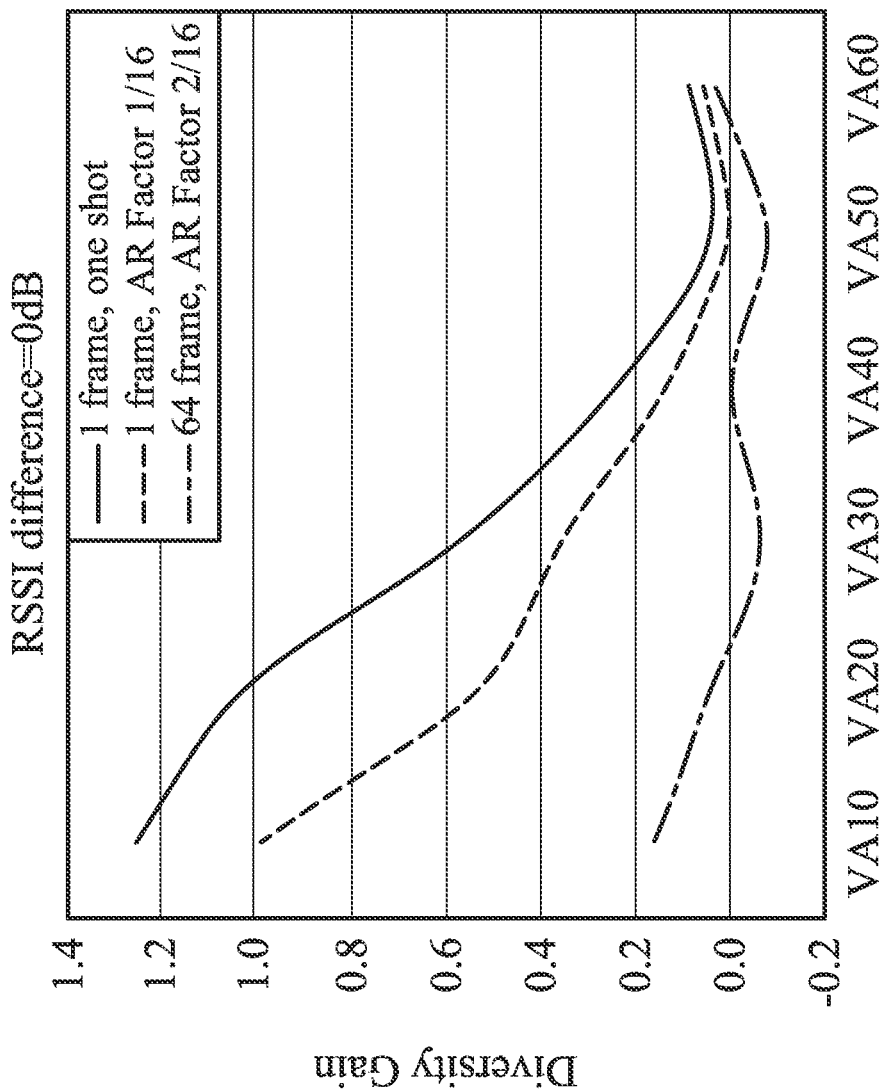
FIG. 6*a* is a diagram showing an experimental result of the diversity gain obtained under different moving speeds according to an embodiment of the invention.

As previously described, the antenna switching period and average scheme may be determined according to the long-term downlink signal quality differences and/or characteristics of the channels. FIG. 6a is a diagram showing an experimental result of the diversity gain obtained under different moving speeds according to an embodiment of the invention. In the embodiment, the experimental result is obtained under the RSSI difference=0 dB, which means the long-term downlink signal qualities received by different antennas were substantially the same (i.e. the long-term downlink signal quality difference=0 dB). The diversity gain is a ratio of the averaged received signal strength of the antenna which is selected according to the switching period and average scheme, to the averaged received signal strength of the fixed antenna (for example, antenna 105). The VA10, VA20, . . . VA60 represent different moving speeds 10 Km/hr, 20 Km/hr, . . . 60 Km/hr of the communications apparatus. Note that there are some mapping relationships between the characteristics of the channels and the moving speeds of the communications apparatus. For example, the less the channel correlation and/or the larger the variations of the RSSI, the higher the determined moving speeds. Therefore, the moving speeds may also be deduced from other characteristics of the channels.

Figure 6B:
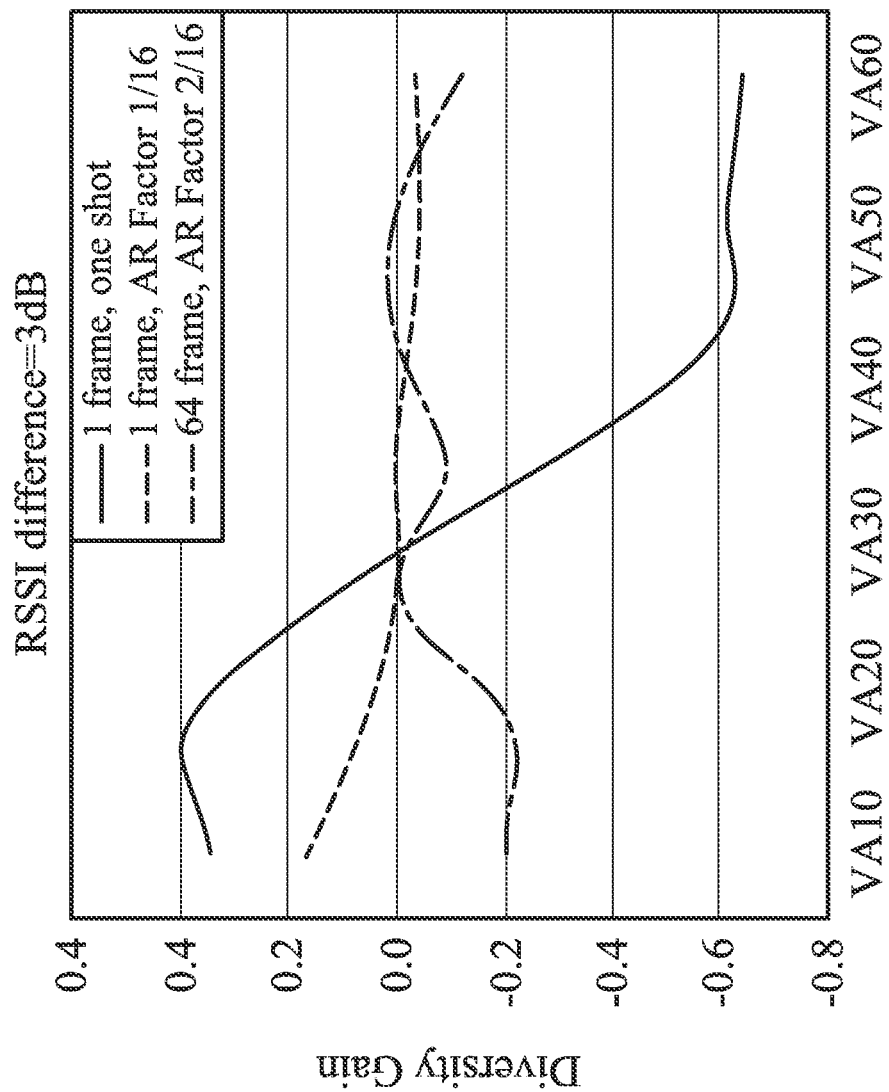
FIG. 6*b* is a diagram showing another experimental result of the diversity gain obtained under different moving speeds according to another embodiment of the invention.
Figure 7A:
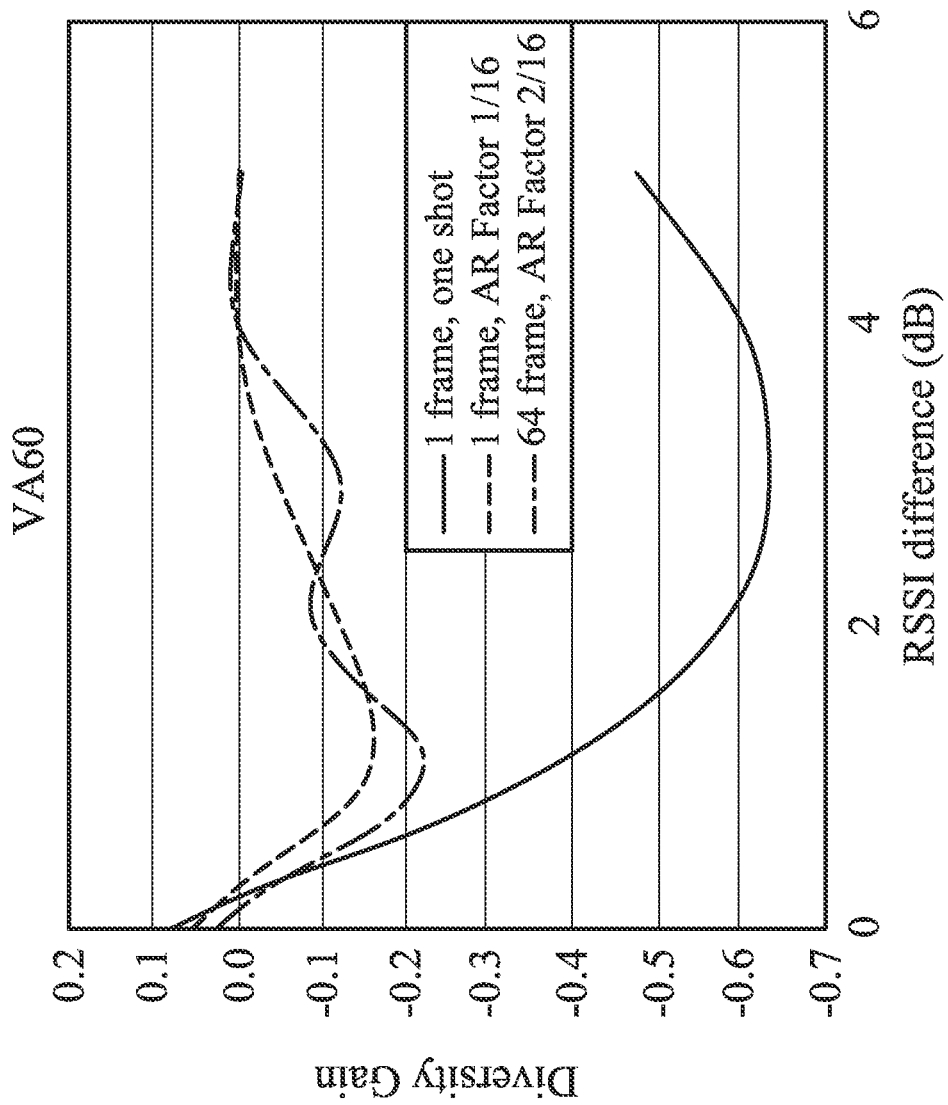
FIG. 7*a* is a diagram showing another experimental result of the diversity gain obtained under different RSSI differences according to another embodiment of the invention.
Figure 7B:
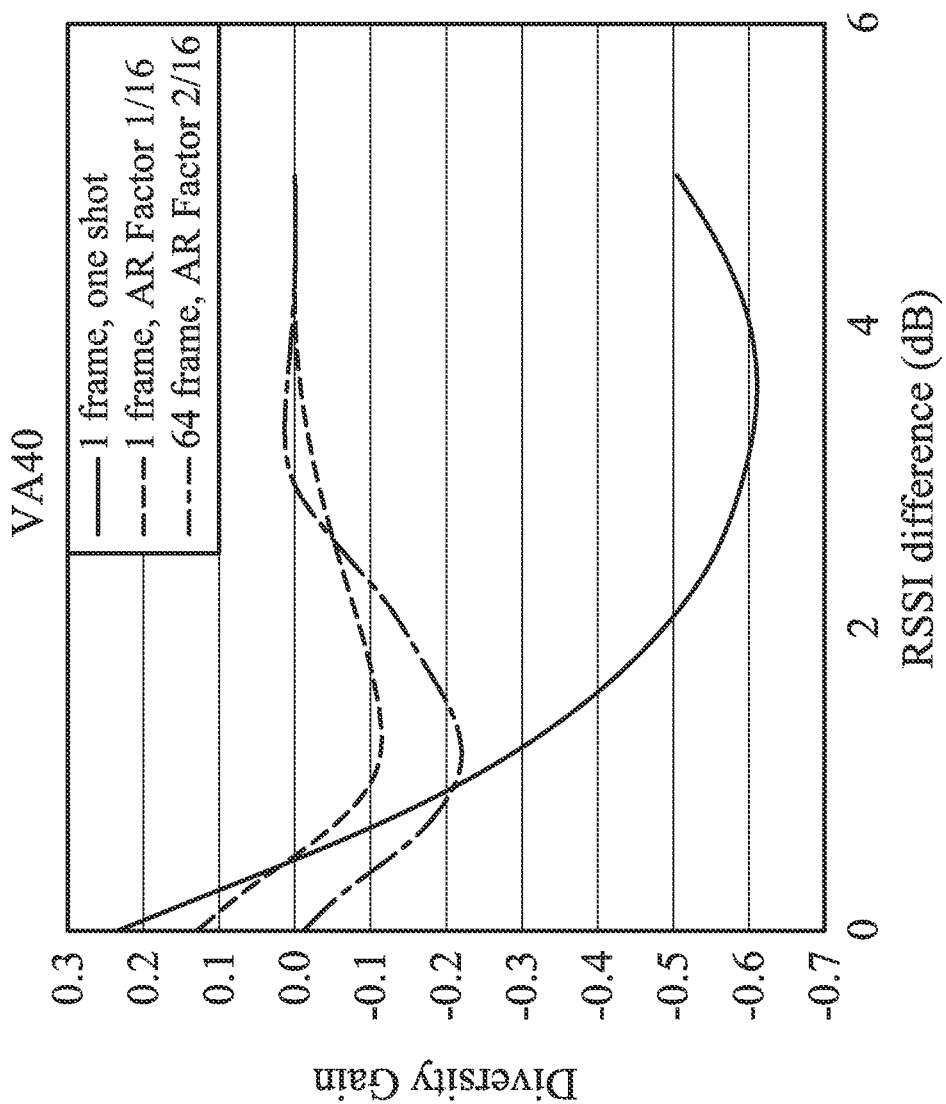
FIG. 7*b* is a diagram showing another experimental result of the diversity gain obtained under different RSSI differences according to yet another embodiment of the invention.

FIG. 6b is a diagram showing another experimental result of the diversity gain obtained under different moving speeds according to another embodiment of the invention. In the embodiment, the experimental result is obtained under the RSSI difference=3 dB, which means the long-term downlink signal qualities received by one antenna is the twice that of another antenna. FIG. 7a is a diagram showing another experimental result of the diversity gain obtained under different RSSI differences according to another embodiment of the invention. In the embodiment, the experimental result is obtained under VA60, which means the communications apparatus is moving at a high speed. FIG. 7b is a diagram showing another experimental result of the diversity gain obtained under different RSSI differences according to yet another embodiment of the invention. In the embodiment, the experimental result is obtained under VA40, which means the communications apparatus is moving at a medium speed.

According to an embodiment of the invention, the experimental results as shown may be established as look-up tables, and after obtaining the characteristics of the channels and the long-term downlink signal quality differences (i.e. the RSSI differences), the processor 110 may check the look-up tables to determine a proper antenna switching period and average scheme having the highest diversity gain. For example, when the obtained RSSI difference=0 dB and the estimated moving speed is 20 Km/hr, the antenna switching period and average scheme that have the highest diversity gain is 1 frame and one shot. That is, the antenna switching period is preferably set to 1 frame, and the downlink signal qualities received in one frame may be directly applied (i.e. does not have to be averaged with the downlink signal qualities received in other frames) as the factor for selecting the optimal uplink path for transmitting the uplink signals. Based on this condition, when the downlink signal qualities received by antenna 104 in a current frame period is better than that of the antenna 105, the processor 110 may generate the antenna selection signal $S_{SEL}$ to direct the antenna selection device to select the antenna 104 for transmitting the uplink signals.

For another example, when the obtained RSSI difference=3 dB and the estimated moving speed is 45 Km/hr, the antenna switching period and average scheme that have the highest diversity gain is 64 frames and an AR (autoregressive average) factor of 2/16. That is, the antenna switching period is preferably set to 64 frames, and the downlink signal qualities may be averaged according to the AR factor of 2/16. Based on the AR factor of 2/16, the averaged downlink signal qualities (i.e. the short-term downlink signal qualities) of each antenna may be obtained by:

$$y1 = \left(1 - \frac{2}{16}\right)x1 + \frac{2}{16}x2 \qquad \text{Eq. (1)}$$

where the x1 represents a previous averaged result of downlink signal qualities, x2 represents a new input of a current downlink signal quality, and y1 represents a current averaged result of downlink signal qualities. Based on the obtained antenna switching period and average scheme, when the calculated short-term downlink signal quality of the antenna 104 is better than that of the antenna 105, the processor 110 may generate the antenna selection signal $S_{SEL}$ to direct the antenna selection device to select the antenna 104 for transmitting the uplink signals.

Figure 8:
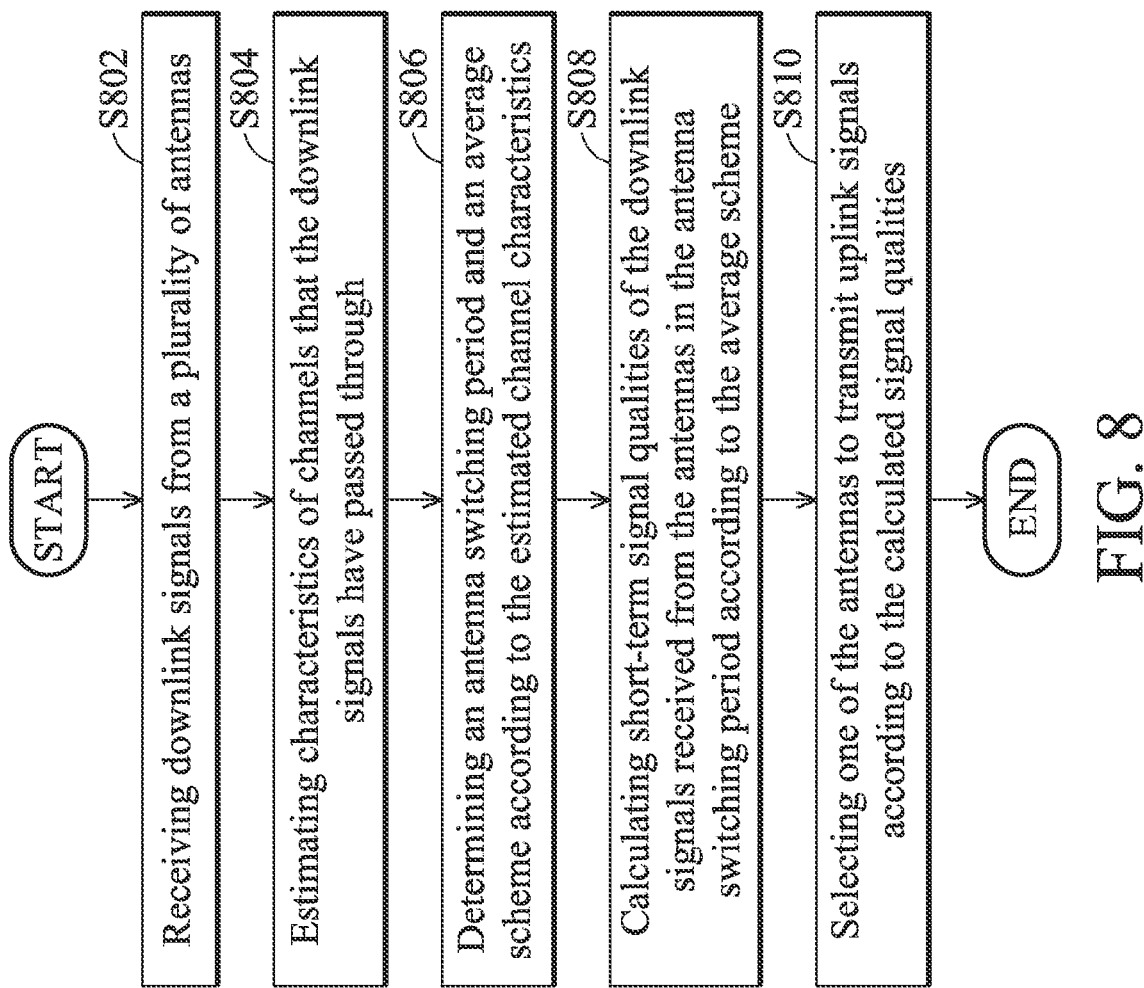
FIG. 8 is a flowchart of an intelligent transmission antenna selection method according to an embodiment of the invention.

In the embodiments, by using the downlink performance to dynamically select the optimal uplink path, uplink performance can be greatly improved. Note that when there are more than two uplink paths, the same concept may also be applied for determining more than one proper uplink path, and the invention should not be limited thereto. FIG. 8 shows a flowchart of an intelligent transmission antenna selection method according to an embodiment of the invention. Firstly, downlink signals are received from a plurality of antennas (Step S802). Next, characteristics of channels that the downlink signals have passed through are estimated (Step S804). Next, an antenna switching period and an average scheme are determined according to the estimated channel characteristics (Step S806). Next, short-term signal qualities of the downlink signals received from the antennas in the antenna switching period according to the average scheme are calculated (Step S808). Finally, one of the antennas is selected to transmit uplink signals according to the calculated signal qualities (Step S810). Note that as discussed above, the long-term downlink signal quality differences between different antennas may also be calculated in step S804 as a factor for determining the antenna switching period and the average scheme, and the invention should not be limited thereto.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a plurality of antennas, arranged to receive downlink signals and transmit uplink signals;
   a transceiver module, arranged to receive the downlink signals from the antennas and pass the uplink signals to an antenna selection device;
   the antenna selection device, coupled between the antennas and the transceiver module, arranged to receive the uplink signals to be transmitted from the transceiver module and dynamically pass the uplink signals to one of the antennas according to an antenna selection signal; and
   a processor, arranged to receive the downlink signals from the transceiver module, calculate short-term signal qualities of the downlink signals received in an antenna switching period and generate the antenna selection signal according to the short-term signal qualities,
   wherein the processor calculates the short-term signal qualities and generates the antenna selection signal during the antenna switching period.

2. The communications apparatus as claimed in claim 1, wherein the processor calculates the short-term signal qualities according to an average scheme.

3. The communications apparatus as claimed in claim 2, wherein the processor further estimates characteristics of channels that the downlink signals have passed through according to the downlink signals, and determines a length of the antenna switching period and the average scheme according to the estimated characteristics of the channels.

4. The communications apparatus as claimed in claim 3, wherein the processor further calculates long-term signal quality differences between different antennas according to the downlink signals received from different antennas, and determines the length of the antenna switching period and the average scheme according to the estimated characteristics of the channels and the long-term signal quality differences.

5. The communications apparatus as claimed in claim 3, wherein the processor estimates the characteristics of the channels by estimating a moving speed of the communications apparatus.

6. The communications apparatus as claimed in claim 3, wherein the processor further estimates channel impulse responses of the channels and estimates the characteristics of the channels by calculating correlations of the channel impulse responses.

7. The communications apparatus as claimed in claim 3, wherein the processor estimates the characteristics of the channels by calculating variations of a received signal strength indicator (RSSI) of the downlink signals.

8. The communications apparatus as claimed in claim 1, wherein the processor calculates the signal qualities of the downlink signals received in a frame period and generates the antenna selection signal to select one of the antennas to transmit the uplink signals in the frame period.

9. An intelligent transmission antenna selection method, comprising:
   receiving downlink signals from a plurality of antennas;
   estimating characteristics of channels that the downlink signals have passed through;
   determining an antenna switching period and an average scheme according to the estimated characteristics of the channels;
   calculating short-term signal qualities of the downlink signals received in the antenna switching period according to the average scheme; and
   selecting one of the antennas to transmit uplink signals according to the calculated short-term signal qualities.

10. The method as claimed in claim 9, further comprising:
    calculating long-term signal quality differences between different antennas according to the downlink signals received from different antennas; and
    determining the antenna switching period and the average scheme further according to the long-term signal quality differences.

11. The method as claimed in claim 9, further comprising:
    estimating a moving speed of a communications apparatus comprising the antennas as one of the characteristics of the channels.

12. The method as claimed in claim 9, further comprising:
    estimating channel impulse responses of the channels; and
    calculating correlations of the channel impulse responses as the characteristics of the channels.

13. The method as claimed in claim 9, further comprising:
    calculating variations of a received signal strength indicator (RSSI) of the downlink signals as one of the characteristics of the channels.

14. The method as claimed in claim 13, further comprising:
    calculating a standard deviation of the RSSI to obtain the variation.

15. The method as claimed in claim 13, further comprising:
    calculating a correlation of the RSSI to obtain the variation.

16. The method as claimed in claim 9, further comprising:
    selecting the one of the antennas to transmit the uplink signals according to the calculated short-term signal qualities in every antenna switching period.

* * * * *